US010994299B2

(12) United States Patent
Minichev et al.

(10) Patent No.: US 10,994,299 B2
(45) Date of Patent: May 4, 2021

(54) TWO-COMPONENT ADHESIVE DISPENSER WITH MIXING UNIT REPLACEMENT SYSTEM

(71) Applicant: Arrival Limited, London (GB)

(72) Inventors: Artem Minichev, St. Petersburg (RU); Ivan Kononov, St. Petersburg (RU)

(73) Assignee: Arrival Limited, London (GB)

( * ) Notice: Subject to any disclaimer, the term of this patent is extended or adjusted under 35 U.S.C. 154(b) by 0 days.

(21) Appl. No.: 16/543,392

(22) Filed: Aug. 16, 2019

(65) Prior Publication Data

US 2020/0055078 A1 Feb. 20, 2020

(30) Foreign Application Priority Data

Aug. 17, 2018 (GB) ..................... 1813468

(51) Int. Cl.
*B05C 17/005* (2006.01)
*B05C 5/02* (2006.01)
*B29B 7/74* (2006.01)

(52) U.S. Cl.
CPC .......... *B05C 17/00553* (2013.01); *B05C 5/02* (2013.01); *B05C 17/00503* (2013.01); *B29B 7/74* (2013.01)

(58) Field of Classification Search
CPC ........ B05C 17/00553; B05C 17/00503; B05C 5/02; B01F 15/00662; B01F 5/00; B01F 5/0609; B01F 2215/006; B01F 2215/0039; B01F 13/0032; B01F 5/0602
USPC ...... 222/145.6, 145.5; 239/135, 61, 62, 432, 239/600; 366/179.1, 181.8
See application file for complete search history.

(56) References Cited

U.S. PATENT DOCUMENTS

| 4,070,008 | A | * | 1/1978 | Schlieckmann | ...... B29B 7/7615 366/159.1 |
|---|---|---|---|---|---|
| 5,092,492 | A | | 3/1992 | Centea | |
| 5,979,794 | A | * | 11/1999 | DeFillipi | ............. B01F 15/0462 239/135 |
| 6,691,932 | B1 | * | 2/2004 | Schultz | ..................... B05B 1/14 239/401 |
| 10,641,423 | B2 | * | 5/2020 | Pappalardo | ............. F16L 37/56 |

(Continued)

FOREIGN PATENT DOCUMENTS

| CN | 203678618 | 7/2014 |
|---|---|---|
| DE | 3821882 | 1/1990 |
| WO | WO96/006920 | 1/1996 |

OTHER PUBLICATIONS

GB Search and Examination Report for corresponding GB Application No. GB1813468.4 dated Feb. 4, 2019, 5 pages.
European Search Report dated Jan. 20, 2020, 8 pages.

*Primary Examiner* — Lien M Ngo
(74) *Attorney, Agent, or Firm* — Lee & Hayes, P.C.

(57) ABSTRACT

A two-component adhesive system pumps a first adhesive component and a second adhesive component into a replaceable mixing unit that can be periodically replaced when the adhesive has cured in the mixing unit. The adhesive system may have a robotic arm coupled to a gripper unit which has an open configuration and a closed configuration. In the open configuration, the gripper unit releases the mixing unit allowing the mixing unit to be replaced. The robotic arm may moves the gripper unit to install a replacement mixing unit. The gripper unit can be moved to the closed configuration and the adhesive can be pumped through the mixing unit.

11 Claims, 8 Drawing Sheets

(56) References Cited

U.S. PATENT DOCUMENTS

| | | | |
|---|---|---|---|
| 2002/0104899 A1* | 8/2002 | Schultz | B05B 1/14 |
| | | | 239/380 |
| 2006/0071019 A1 | 4/2006 | Engelbrecht | |
| 2006/0157508 A1 | 7/2006 | Suchan et al. | |
| 2011/0319930 A1 | 12/2011 | Roush et al. | |
| 2017/0165621 A1* | 6/2017 | Reuter | B01F 3/0861 |

* cited by examiner

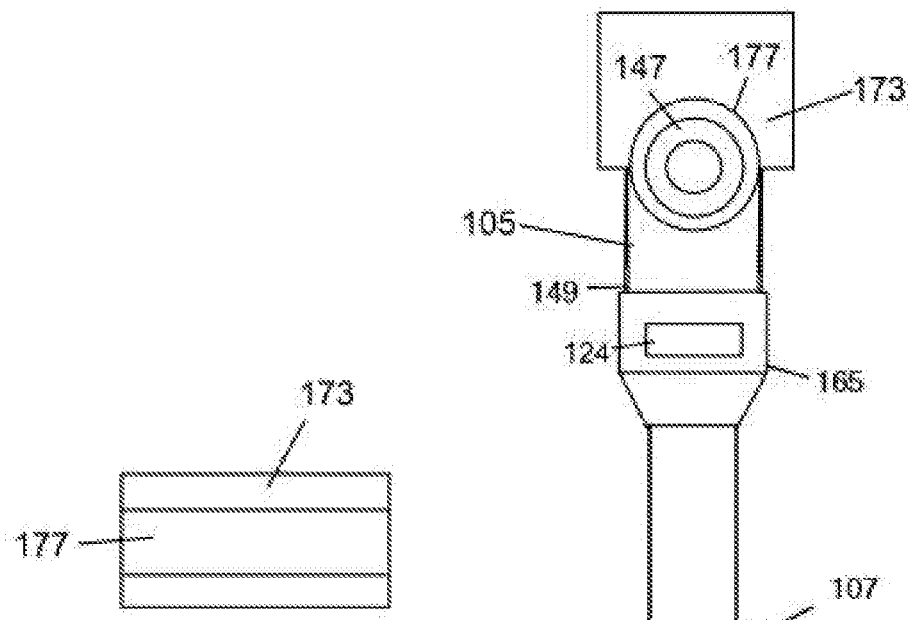

TWO-COMPONENT ADHESIVE DISPENSER WITH MIXING UNIT REPLACEMENT SYSTEM

This Application claims priority to GB Application 1813468.4, filed Aug. 17, 2018, which is incorporated herein by reference for all purposes.

The present disclosure relates to a system for dispensing a two-component preparation, for example two-component adhesive, as well as to a mixing device and a gripper device for use in the dispensing of a two-component preparation.

BACKGROUND

Two-component adhesives are an example of a two-component preparation and are also known as reactive adhesives or structural adhesives. They are characterized by the fact that they cure not because a substance such as a solvent, for example water, evaporates, but because of a chemical reaction between two-components of the adhesive. It is important for the two required components to be dosed in the correct mixing ratio and for them to be evenly mixed to create a homogeneous mixture. Two-component adhesives are preferably solvent-free.

FIG. 1 illustrates a two-component adhesive cartridge dispenser 171 and mixing nozzle 107. The adhesive dispenser 171 includes two cylinders 155, 157 and two pistons 159, 161 coupled to a plunger 169. A first adhesive component is stored in the first cylinder 155 and a second adhesive component is stored in the second cylinder 157. The inlet 165 of the mixing nozzle 107 is screwed onto an outlet 143 of the adhesive dispenser 171. When the plunger 171 is pressed into the cylinders 155, 157, the pistons 159, 161 compress the two adhesive components driving them through the outlet 143 and into the mixing nozzle 107. The mixing nozzle 107 has internal mixing features which can mix the two adhesive components together before the mixed adhesive exits the mixing nozzle 107. The mixing of the two adhesive components will result in a chemical reaction and the mixture will begin to harden. Once the adhesive hardens within the mixing nozzle 107 it is necessary to replace the mixing nozzle 107. Thus, the mixing nozzle 107 is a single use device that is no longer functioning or usable once the adhesive cures.

In industrial or commercial two-component adhesive dispenser systems, larger volumes of adhesive components can be used for assembly line applications. However, a problem with these known systems is that the mixing nozzle must be replaced each time the glue hardens within the mixing nozzle. In automated manufacturing systems, a robot determines that the mixing nozzle must be replaced. A mixing nozzle replacement notification is sent to the operator who then has to walk to the robot. The operator must then manually detach the used static mixing nozzle from an adhesive application head and throw the used static mixing nozzle into a waste container. The operator must then manually clean the adhesive mixing area on the adhesive application head. Once cleaned, the operator must remove the new static mixing nozzle from its packaging and install the new static mixing nozzle on the adhesive application head of the adhesive dispenser. The operator then sends a signal to the adhesive dispenser to resume operation so that the production line processing can continue.

On average, the time between mixing nozzle replacements can vary from about 10 to 20 minutes. The replacement of the mixing nozzle can require worker time to perform, which can interrupt or postpone the industrial production. When the mixing nozzle is removed, the glue components may also leak from the system when the mixing nozzle is removed from the system. What is needed is an improved system for replacing the mixing nozzle in order to minimize the down time of a gluing system used in a production process.

SUMMARY OF THE DISCLOSURE

The present disclosure is directed towards a two-component dispensing system, for example a two-component adhesive dispensing system, which includes a replaceable two-component mixing unit that is coupled to a robotic arm with a gripper device. The mixing unit can include a mixing block coupled to a mixing nozzle. The mixing block can have an input for each of the two adhesive components and a single outlet, which is coupled to the inlet of the mixing nozzle. The mixing nozzle can be a standard element, which can have internal features to thoroughly mix the two adhesive components. Pumps can force each of the adhesive components through the mixing nozzle which mixes the adhesive components as they flow through to the outlet of the mixing nozzle.

The mixing unit can be grabbed by a gripper device and periodically replaced when the two-component adhesive hardens. During the mixing unit installation process, the open gripper device can be placed over a new mixing unit and closed to grab a single mixing unit from a mixing unit feeder or a mixing unit storage area. When the gripper device is closed, the gripper device securely holds the mixing unit and couples the tubes feeding the two adhesive components to inlets of the mixing unit. The replacement mechanism can then release the mixing unit. In an embodiment, when the gripper unit is moved between the opened and closed configuration, actuators in the gripper unit are used to move the gripper jaws between fixed opened and closed positions.

During a manufacturing process, the robotic arm can move the mixing nozzle to a desired location and then emit the mixed adhesive. When adhesive output is needed, the adhesive dispensing system can open adhesive component valves and pump the adhesive components into the mixing unit. The pumps can stop and/or the adhesive component valves can close when the desired quantity of the adhesive is placed on the target location, to stop the flow of the adhesive. The robotic arm is moved to the next target location and the adhesive emission process is repeated. During this normal operation, the adhesive can eventually harden in the mixing unit.

The adhesive dispersing system can monitor and/or predict the hardening of the adhesive in the mixing unit with sensors which can measure pressure or volumes of the adhesive components flowing into the mixing unit. Once the adhesive hardening is detected and/or predicted, the system can stop the flow of the adhesive components by stopping the pumps and closing the adhesive valve(s). The system can then replace the mixing unit. The system can discard the used mixing unit and install a new mixing unit with a robotic mixing unit replacement mechanism. During the mixing unit replacement, the pumps might be switched to reverse the pumping to create a vacuum to suck excessive amounts of non-mixed adhesive components back to avoid them dripping on the adjacent to mixing unit surfaces (jaws), also known as "snuff back". The described process can then be repeated with the system emitting the mixed adhesive as described.

Aspects of the disclosure are set out in the accompanying independent claims, with optional features set out in dependent claims.

Additional aspects of the disclosure comprise a mixing unit for mixing a two-component preparation. The mixing unit comprises a static mixer nozzle and a body coupled to the static mixing nozzle. The body has a first component inlet for a first component of the two-component preparation and a second component inlet for a second component of the two-component preparation, as well as internal passages connecting the first component inlet and the second component inlet to the static mixing nozzle. Specifically, the first and second component inlets are arranged to face away from each other. This enables each of the first and second component inlets to be connected to a respective component coupling disposed on an inner surface of a respective jaw of a gripper device. For example, the first and second component inlets may be axially aligned on opposite sides of an inlet bore. Aspects further extend to a gripper device for gripping a mixing unit as described above. The gripper device comprises first and second jaws and a respective component coupling disposed on an inner surface of each jaw to couple to a respective one of the first and second component inlets. The component couplings are connectable to respective tubes, each for delivering respective components of the two-component preparation. Yet further, aspects extend to a system comprising such a mixing unit and gripper device. In all these aspects, the two-component preparation may be a two-component adhesive.

BRIEF DESCRIPTION OF THE DRAWINGS

The accompanying drawings are included to provide a further understanding of the disclosure and are incorporated in and constitute a part of this specification. The drawings illustrate embodiments of the disclosure and, together with the description, serve to explain the principles of the disclosure. In the drawings.

FIG. 7 illustrates a top view of an embodiment of a mixing unit alignment structure.

FIG. 8 illustrates a side view of an embodiment of a mixing unit in an alignment structure.

DETAILED DESCRIPTION

Figure 1:
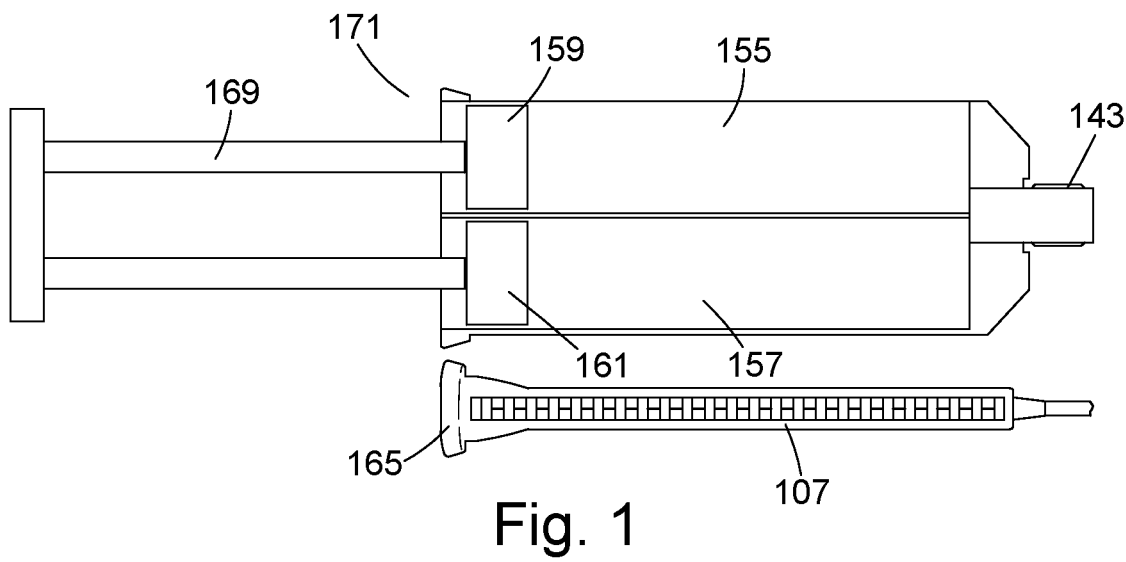
FIG. 1 illustrates a side view of a manually actuated two-component adhesive dispenser and a mixing nozzle.

The present disclosure is directed towards a two-component adhesive dispensing system. Two-component structural adhesives are the preferred solution for applications in which very high strengths are expected or required by the adhesive joints. These structural adhesives are primarily used to join high-strength materials such as bare, coated, painted or pre-treated metals, and composite materials such as glass-reinforced plastics (GRP+SMC) or carbon fiber-reinforced plastics (aramid, carbon, CFC) to either the same material or a different type of metals/composite material, and to other solid materials such as ceramics or glass materials. Two-component adhesives have been used in various applications including: lightweight construction, both metals and composite materials, vehicle construction and transport such as cars, railway vehicles, aircraft, mechanical engineering, apparatus, appliance and housing construction, medical technology, electrical and electronic production, component assembly bonding, technical consumer goods such as household appliances, prefabricated elements for construction, hardware such as doors and gates.

Two-component adhesives require the two adhesive components to be mixed in a mixing process. In addition to manual or mechanical dosing and mixing, working from double-chamber cartridges which are also known as side-by-side cartridges, has proved to be a successful technique. In these cartridges, the two components are stored in separate cylindrical container that keep the two liquid components separate from each other prior to use. The two liquid adhesive components can be mixed in various volume ratios such as:

1:1, 2:1, 10:1 or any other ratio of parts by volume, depending on the adhesive recipe. In different embodiments, the present disclosure can be used with two-component adhesives having any mixing ratio.

In a 1:1 mix ratio embodiment, the two-components are pressed in equal quantities through a static mixer (mixing tube) by suitable dispenser guns which can being manual, mechanical, hydraulic, pneumatic or other drive method. The mixture is then immediately applied to the objects to be bonded together. Once the adhesive is applied, the parts need to be held together during the time required for the adhesive to cure. Gluing is also widely used in robotized manufacturing processes.

Static mixing nozzles are used with the dispenser or with metered volume mix and dispensing equipment. Static mixers are also known as motionless mixer because these mixing nozzles have no moving parts, or in some cases have passive moving parts that are driven by the flow of the adhesive. The mixing nozzle has a plurality of mixing elements within a plastic tube. When two adhesive components are forced through the mixing nozzle, they are divided and joined repeatedly creating a uniform mix of the first adhesive component and the second adhesive component. There can be various different types of the glue components within the dispenser cylinders as well as various mixing nozzle form factors. However, the basic two-component mixture principle is still the same. For example, in an embodiment, the two components can be a resin and catalyst or in other embodiments, the two components can be different components of an epoxy adhesive.

The present disclosure is an addition or enhancement to the conventional two-component adhesive static mixers, used in robotized production lines for gluing applications. Although the disclosure has been described as being used with two-component adhesives, in the described system can equally be used to mix different kinds of liquids in different fields of technology, for example: paints, active chemicals, etc. The present disclosure can be used in any systems for automatic two components adhesives and in any application, for example: surface application (gluing of panels, windshields), adhesives injection (gluing of pre-assembled bushings). The glue can be applied directly to a surface or injected into other desired locations.

Figure 2:
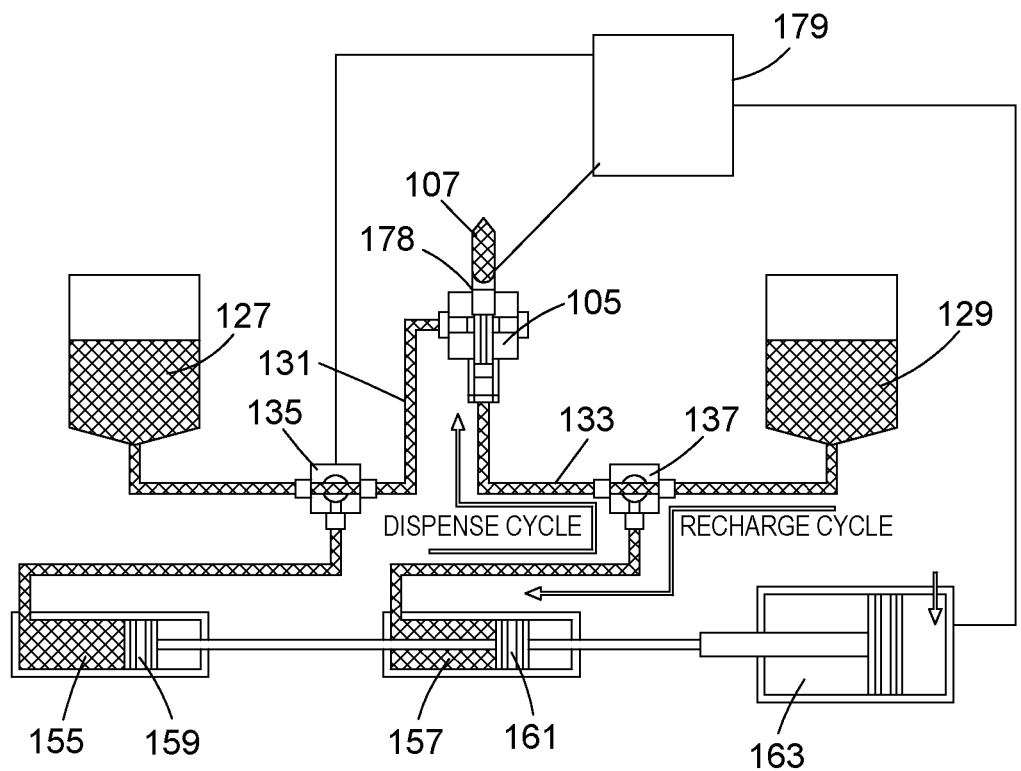
FIG. 2 illustrates a block diagram of a machine actuated two-component adhesive dispenser.

FIG. 2 illustrates an embodiment of an industrial two-part adhesive dispensing system. In the illustrated embodiment, the system has a first container 127 holding a first adhesive component and a second container 129 holding a second adhesive component. The first container 127 is coupled to a first valve 135, a first cylinder 155 and a mixing nozzle 107 with tubing 131. The second container 129 is coupled to a second valve 137, a second cylinder 157 and the mixing nozzle 107 with tubing 133. A first plunger 159 can slide axially within the first cylinder 155 and a second plunger 161 can slide axially within the second cylinder 157. The first plunger 159 and the second plunger 161 can be coupled to drive mechanism 163 which controls the movements of the first plunger 159 and the second plunger 161.

The system can have a recharging cycle which fills the cylinders 155, 157 and a dispensing cycle which drives the adhesive components from the cylinders 155, 157 to the mixing nozzle 107. During a recharging cycle, the first valve 135 is moved to a recharge position that allows the first adhesive component to flow from the first container 127 through the first valve 135 into the first cylinder 155 and the second valve 137 is moved to a recharge position that allows the second adhesive component to flow from the second container 129 through the second valve 137 into the second cylinder 157. The drive mechanism 163 can be actuated to move the plungers 159, 161 to draw the first adhesive component from the first container 127 into the first cylinder 155 and the second adhesive component from the second container 129 into the second cylinder 157.

During the dispensing cycle, the first valve 135 is moved to a dispense position that allows the first adhesive component to flow from the first cylinder 155 through the first valve 135 to the mixing nozzle 107 and the second valve 137 is moved to a dispense position that allows the second adhesive component to flow from the second cylinder 157 through the second valve 137 to the mixing nozzle 107. The drive mechanism 163 can be actuated to move the first plunger 159 to compress the first adhesive component in the first cylinder 155 and drive the first adhesive component into the mixing nozzle 107 through the first adhesive component tubing 131. The drive mechanism 163 can also move the second plunger 159 to compress the second adhesive component in the second cylinder 157 and drive the second adhesive component into the mixing nozzle 107 through the second adhesive component tubing 133.

During use with a robotic system, the mixing nozzle 107 and mixing block 105 can be attached to a robotic arm which positions the mixing nozzle 107 to deposit the mixed adhesive on a product. Once the nozzle is properly positioned, the drive mechanism 163 can be actuated with the valves 135, 137 in the dispensing positions to drive the plungers 159, 161 to force the two adhesive components from the cylinders 155, 157 through the tubing 131, 133 to the mixing block 105 and the mixing nozzle 107. After the required volume of adhesives has been emitted from the mixing nozzle 107, the drive mechanism 163 can stop the movement of the plungers 159, 161 to stop the flow of the adhesive through the mixing block 105 and the mixing nozzle 107. The robotic arm can relocate the mixing nozzle 107 and the process can be repeated.

When or just before the adhesive hardens within the mixing nozzle 107, the mixing nozzle 107 will need to be replaced. Until this point, the system can operate as normal to emit the adhesive through the mixing block 105 and mixing nozzle 107. In an embodiment, the system can monitor the adhesive mixing and processing and replace the mixing nozzle 107 when adhesive hardening is detected or predicted by the system. In an embodiment, the system can include a sensor 178 that is attached to the mixing nozzle 107 or mixing block 105. The sensor 178 can be coupled to a processor 179 which can stop the flow of the first component and the second component to allow the replacement of the mixing nozzle 107 and mixing block 105 under conditions that may detect or predict hardening of the adhesive and the need to replace the mixing nozzle 107 and mixing block 105.

In different embodiments different information can be used to detect or predict that the mixing block 105 and mixing nozzle 107 need to be replaced. For example, the sensor 178 can detect the pressure or volume of the adhesive flowing into the mixing block 105. For example, if the pressure exceeds a predetermined mixing unit pressure, the sensor 178 can transmit the pressure information to the processor 179 which can stop the emission of the adhesive and instruct a robotic mixer replacer to initiate a change of the mixing nozzle 107 and mixing block 105. Alternatively, the sensor 178 can transmit the adhesive volume flow information to the processor 179. When the volume adhesive exceeds a predetermined maximum adhesive volume the processor 179 can stop the pumps and the emission of the adhesive so the mixing nozzle 107 and mixing block 105 can be replaced. In yet another embodiment, if the duration of time exceeds a predetermined mixing unit change time period, the processor can stop the emission of the adhesive and instruct a robotic mixer replacer to initiate a change of the mixing nozzle 107 and mixing block 105. These predetermined values for pressure, volume, and time can be stored in an electronic memory accessed by the processor 179. The stored values can be changed and replaced if necessary or if errors in the values are determined. FIG. 2 illustrates one embodiment of a two-component adhesive dispensing system. In other embodiments, the present disclosure can be used with any other type of two-component dispensing system that requires periodic replacement of the mixing unit.

The present disclosure is directed towards a system that robotically removes and replaces the mixer unit, containing the nozzle 107 and mixing block 105 when the adhesive hardens, and the functional performance is diminished. The time required for the adhesive to harden in the nozzle 107 and mixing block 105 can depend upon the chemical composition of the adhesive components. Different adhesives can have different cure times. Adhesives that have faster cure times will need to have the mixing unit replaced sooner than adhesives that have slower cure rates. In different embodiments, various methods can be used to determine if the mixing unit needs to be replaced. For example, in an embodiment, the system can replace the nozzle 107 and mixing block 105 when increased pressure is detected to emit the mixed adhesive from the nozzle 107. In this embodiment, the system can include a pressure sensor coupled to the adhesive component tube(s) 131, 133. In other embodiments, the inventive system can replace the nozzle 107 at periodic durations of time such as 10 to 20 minutes.

Figure 3:
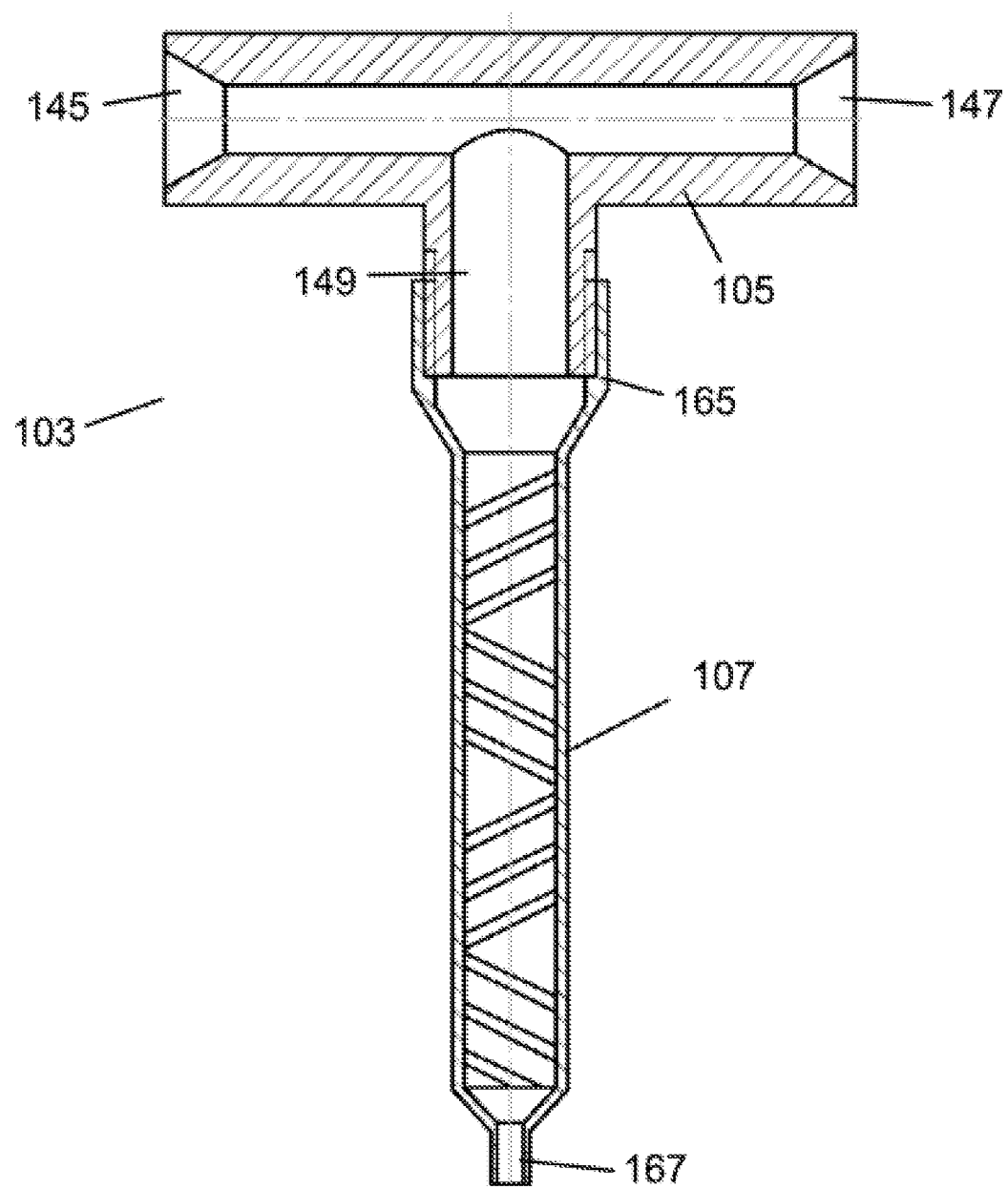
FIGS. 3 and 4 illustrate a respective side cross section view of embodiments of a two-component adhesive mixing unit.
Figure 4:
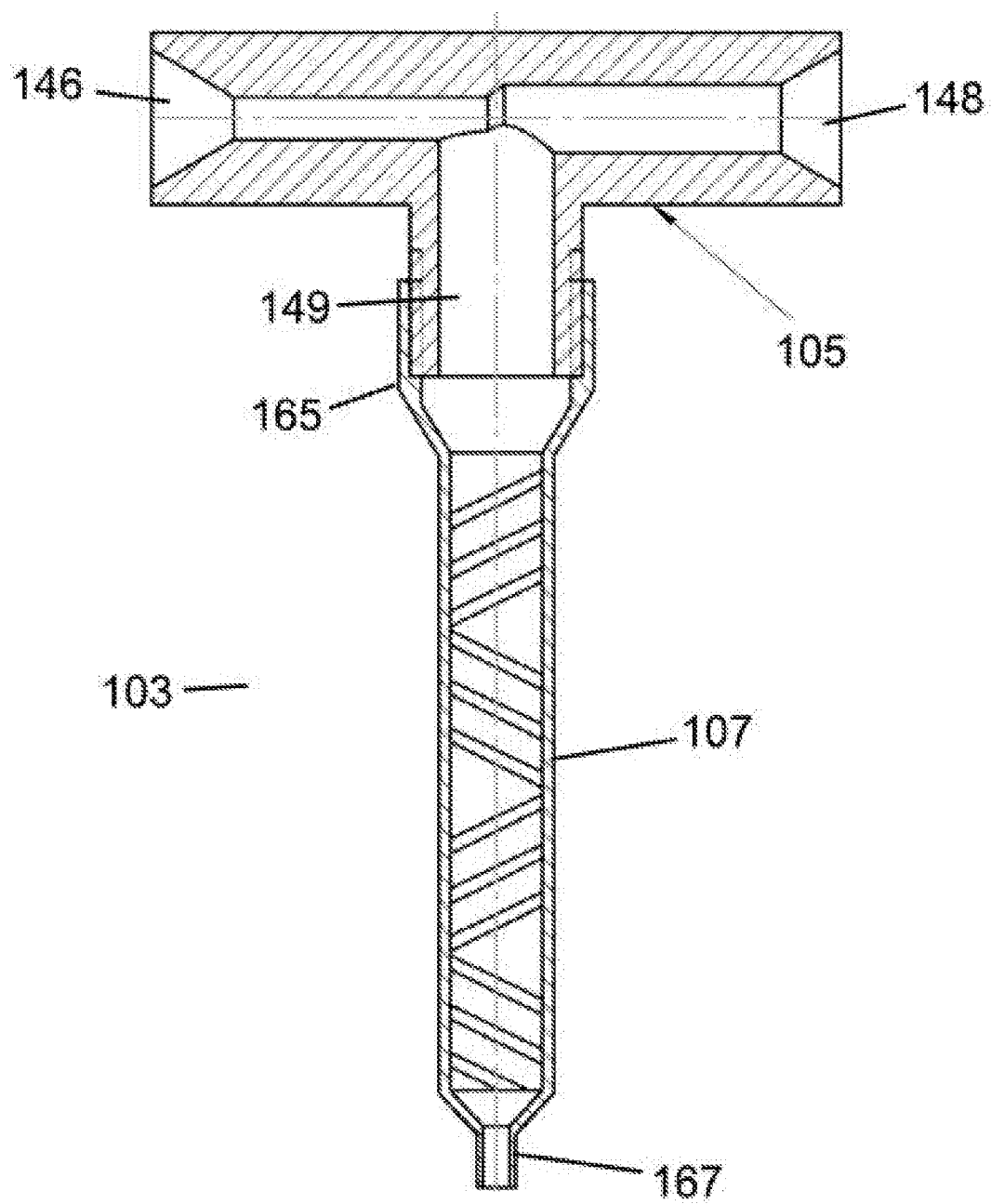

With reference to FIGS. 3 and 4 embodiments of a replaceable mixing unit 103 are illustrated. The proposed mixing unit includes a mixing block 105 that is coupled to a mixing nozzle 107. The mixing block 105 has a first component inlet 145 and a second component inlet 147. In this embodiment, the mixing block 105 can be a "T" shaped structure with "T" shaped internal component pathways. The first component inlet 145 is axially aligned with the second component inlet 147, with the first component inlet 145 and the second component inlet 147 on opposite sides of an inlet bore. The outlet intersects a center portion of the inlet pathways. In this example, the outlet 149 is perpendicular to the first component inlet 145 and a second component inlet 147. FIG. 3 illustrates a mixing block 105 that has a symmetric configuration, in which the first component inlet 145 and the second component inlet 147 are identical in shape. In contrast, FIG. 4 illustrates an asymmetric mixing block 105, in which the second component inlet 147 has a larger inner diameter than the inner diameter of the first component inlet 145. This asymmetry can be necessary when the mixing ratio of the first and second adhesive components are not 1:1 or if the viscosity of the second adhesive component is greater than the viscosity of the first adhesive component. In the mixing block 105 embodiment illustrated in FIG. 4, the larger inner diameter of the second component inlet 147 can result in a higher volume of the second adhesive component being mixed with the first adhesive component.

The "T" shape of the mixing unit allows the gripper unit on an end of a robot arm to install new mixing units and remove used mixing units. Once the jaws of the gripper device close, the mixing unit is secured to the gripper device on the end of the robot arm. The inlets 145, 147 of the mixing block 105 are conical surfaces they can form fluid tight seals with spherical surfaces of adhesive couplings. The jaws of the gripper device can also contact and securely hold the mixing nozzle 107 so that closing the jaws of the gripper unit guarantees the proper alignment of the mixing unit, which is not possible with different mixing unit configurations.

The mixing block 105 can provide an increase in the distance between the first component inlet 145 and the second component inlet 147 and the mixing space to avoid the possibility of adhesive component contamination. The base surfaces of the mixing block 105 can have a shape that engages an alignment structure 173 to ensures that the mixing unit is securely held in the gripper device 111.

The mixing nozzle 107 has an inlet 165 that is coupled to the outlet 149 of the mixing block 105. In the illustrated embodiment, the inlet 165 has a circular cross section that has internal threads which engage external threads formed on the outer cylindrical surface of the outlet 149 of the mixing block 105 and form a liquid tight seal. The mixing nozzle 107 can be a standard part that has internal features which thoroughly mix the first component with the second component before the two-part adhesive exits the nozzle outlet 167. However, in other embodiments the described system can use any other non-standard mixing nozzle design.

Figure 5:
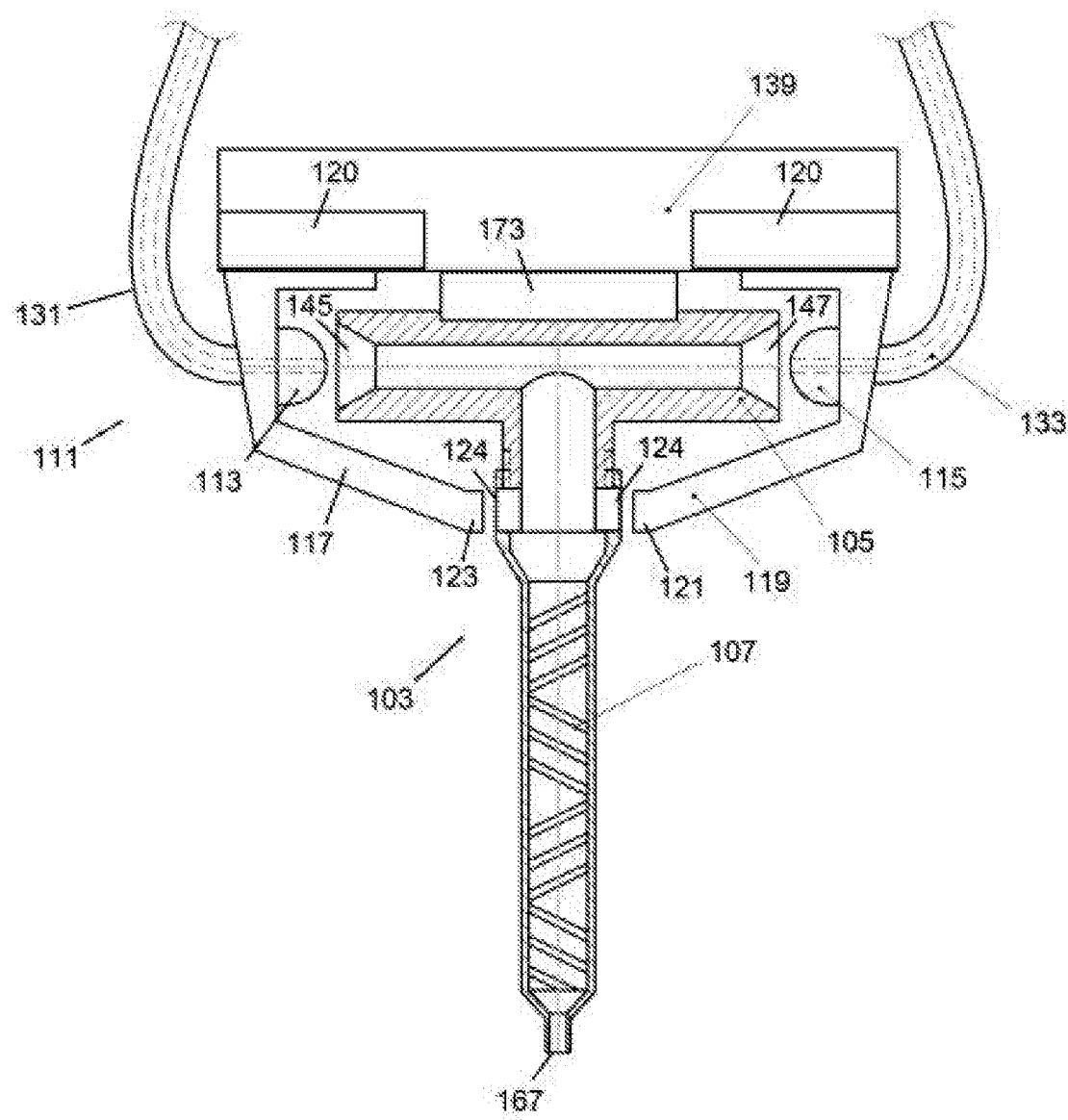
FIG. 5 illustrates a side cross section view of an embodiment of a mixing unit placed in an open gripper device.
Figure 9:
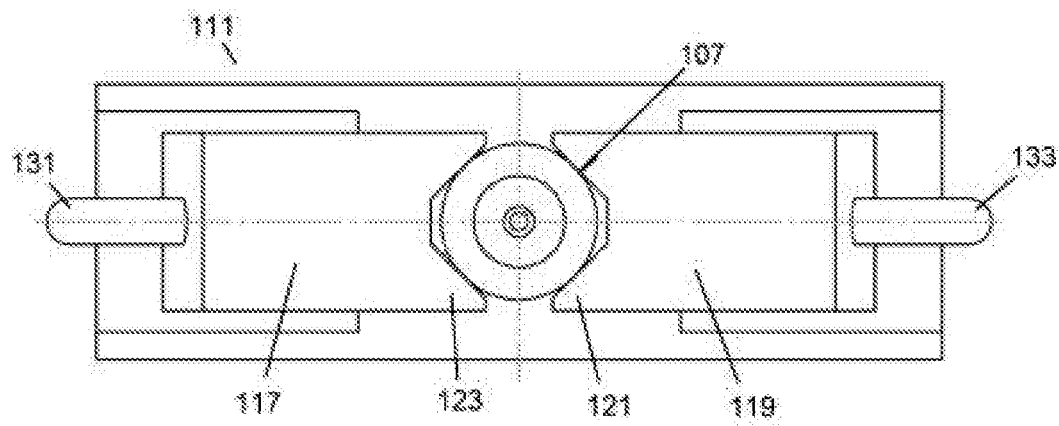
FIGS. 9, 10 and 11 illustrate a respective bottom view of embodiments of a mixing unit securely held in a closed gripper device.
Figure 10:
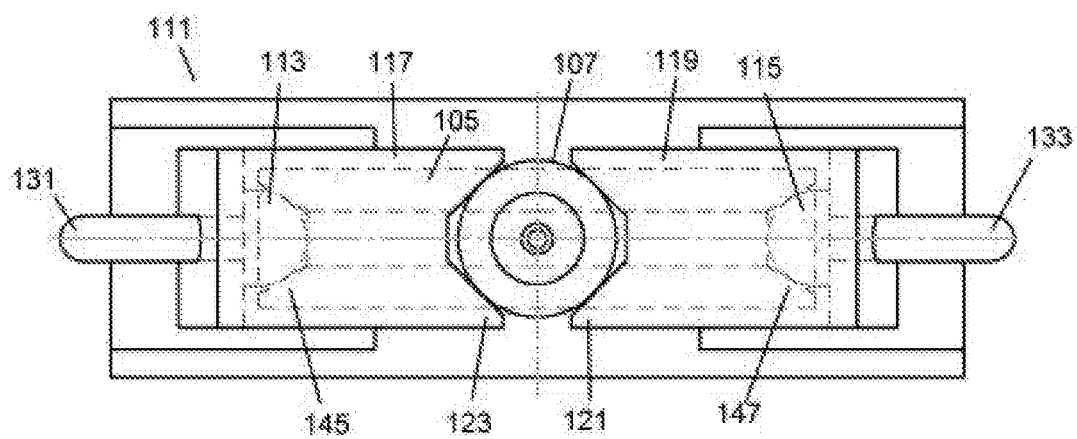

With reference to FIG. 5, the mixing unit 103 can be releasably attached to a robotic adhesive application arm 139 with a gripper device 111 mechanism, which is shown in an open configuration. The gripper device 111 can include a first jaw 117 and a second jaw 119, a first component coupling 113 mounted on an end of a first component tubing 131 and a second component coupling 115 mounted on an end of a second component tubing 133. The first component coupling 113 can be attached to an inner surface of the first jaw 117 and the second component coupling 115 can be attached to an inner surface of the second jaw 119. The first jaw 117 and the second jaw 119 can be coupled to actuators 120 which can move the first jaw 117 and the second jaw 119 to an open position in which the gripper device 111 is in the open configuration. In the illustrated embodiment, the end 123 of the first jaw 117 and the end 121 of the second jaw 119 can be aligned with recesses 124 on the outer surface of the mixing unit 103. However, in other embodiments the mixing nozzle 107 does not have recesses and the ends 121, 123 of the jaws 117, 119 securely hold the outer diameter of the mixing nozzle 107 as shown in FIGS. 9-10 described below.

The mixing unit 103 can be placed in a storage device such as a feeder, cartridge, or storage area with a plurality of other unused mixing units 103. The robot arm 139 with the jaws 117, 119 in an open position can be moved to pick up a mixing unit 103 from the storage device. The robot arm 138 can place the mixing block 105 into an open space between the first jaw 117 and the second jaw 119. In an embodiment, the robot arm 138 can be positioned so the mixing block 105 can contact an alignment structure 173 which can have a feature such as a groove or concave surface that helps to align the first inlet 145 with the first coupling 113 and the second inlet 147 with the second coupling 115. Once the mixing unit is properly positioned, the first jaw 117 and the second jaw 119 can be closed to secure the mixing unit to the robot arm 138.

Figure 6:
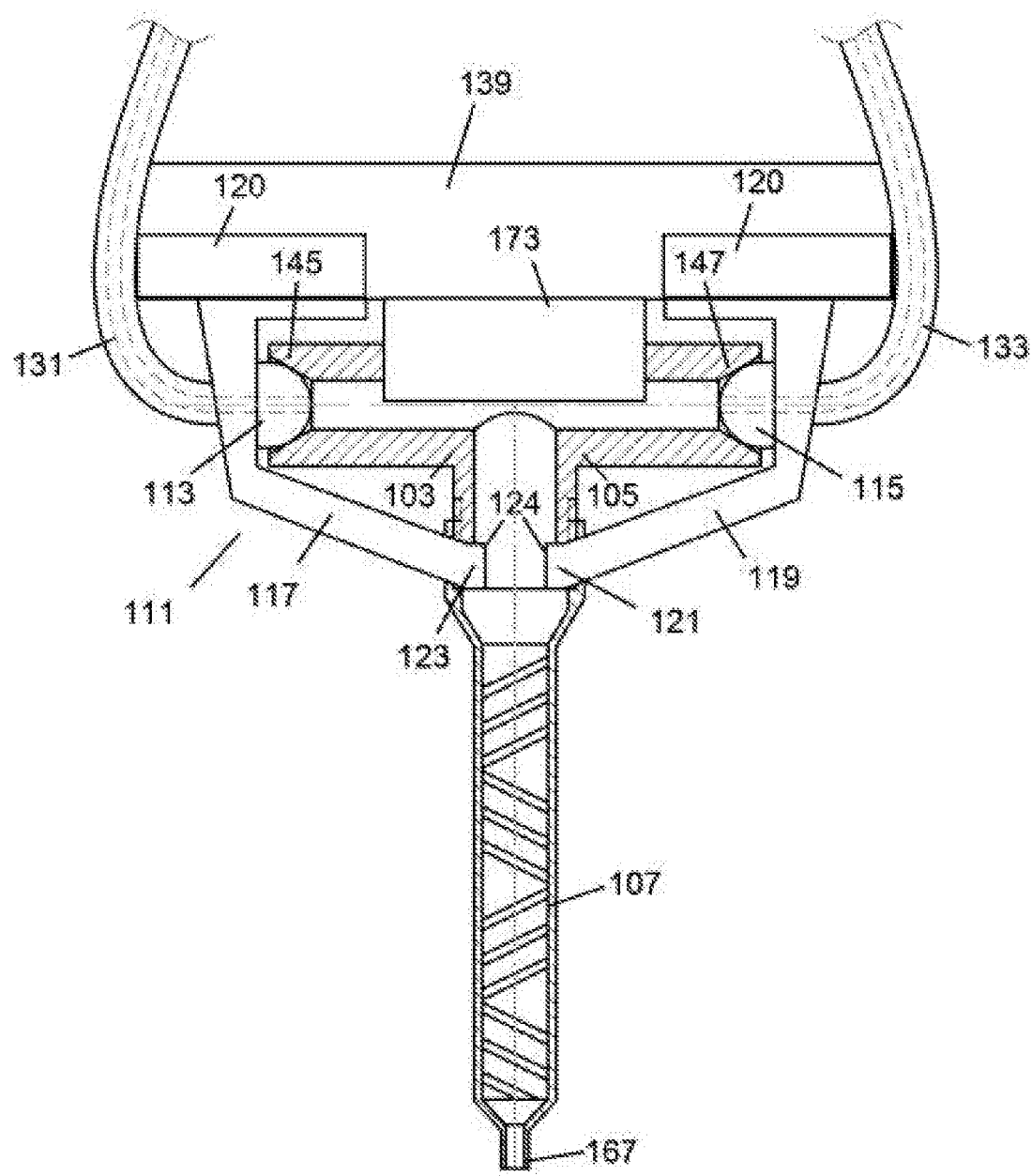
FIG. 6 illustrates a side cross section view of an embodiment of a mixing unit securely held in a closed gripper device.

With reference to FIG. 6, once the mixing unit 103 is properly positioned on the alignment structure 173, the actuators 120 can move the first jaw 117 and the second jaw 119 to their closed positions. In the closed position, the first coupling 113 can be compressed against the first inlet 145 and the second coupling 115 can be compressed against the second inlet 147 forming liquid tight seals. In an embodiment, the first coupling 113 and the second coupling 115 and/or the first coupling 113 and the second coupling 115 can provide a liquid tight seal. The sealing of the first inlet 145 and the second inlet 147 is assured via coupling 113 and 115 which are attached to the tubes for injecting the adhesive components. The first coupling 113 and the second coupling 115 can have geometric shapes which provide a liquid tight seal against the inlets of the mixing block 105, which can have corresponding geometric shapes that can improve the sealing. These geometric shape combinations can include: a concave conical surface coupled to a convex spherical surface, a convex spherical surface which is coupled to a concave cylindrical surface, a convex conical surface that is coupled to a concave cylindrical surface, a concave conical surface that is coupled to a convex conical surface, a concave spherical surface that is coupled to a convex spherical surface, and others geometric combinations.

In an embodiment, the mixing unit 103 or the first inlet 145 and the second inlet 147 portions of the mixing unit 103 can be made of an elastic material such as plastic which can be elastically or plastically deformed to create a seal when the first jaw 117 and the second jaw 119 are closed. Deformation of the material used to form first component inlet 145 and the second component inlet 147 in the mixing block 105 can improve the liquid tight seals formed between the first coupling 113 and the first inlet 145 and the second coupling 115 and the second inlet 147. Because the mixing block is periodically replaced, the component inlet 145 and the second component inlet 147 may not need to be extremely durable. In contrast, the first coupling 113 and the second coupling 115 must be made of a more durable material because they are coupled to many mixing blocks 105. In an embodiment, the first coupling 113 and the second coupling 115 can be made of a metal material having a smooth surface while the first component inlet 145 and the second component inlet 147 can be made of material such as plastic or polyethylene. In other embodiments, the first inlet 145 and the second inlet 147 can be made of an inelastic material and the compressive forces of the first coupling 113 and the second coupling 115 against the mixing unit can be sufficient to provide liquid tights without any material deformation.

These liquid tight connections between the first coupling 113 and the first inlet 145 and the second coupling 115 and the second inlet 147 must withstand the internal forces from the pressurized adhesive component flowing within the system. The pressure of the liquid adhesive can depend on the glue components chemical contents, the adhesive viscosities as well as the internal passageway configuration of the mixing unit. A higher viscosity adhesive may require more internal pressure than a lower viscosity adhesive. A mixing unit with narrower cross section internal passageways can require more internal pressure than a mixing unit with larger cross section internal passageways.

In an embodiment, the minimum internal adhesive pressure can be 3 $kg/cm^2$ and the maximum internal adhesive pressure can be 160 $kg/cm^2$. The required compressive force between the inlets 145, 147 and the couplings 113, 115 can be greater than the maximum internal pressure divided by the cross-sectional area of the couplings. For example, if the internal pressure is 160 $kg/cm^2$ and the cross-sectional area is 0.5 $cm^2$ then the compression force must be greater than 80 kg of force.

The end 123 of the first jaw 117 and an end 121 of the second jaw 119 can be inserted into the recesses 124 in the mixing unit 103. With the jaws 117, 119 in the closed position, the mixing unit 103 cannot be removed from the adhesive system. The contact points between mixing nozzle 107 of the mixing unit 103 and the gripper device 111 can also provide a secure connection so the robotic adhesive application arm 139 and can precisely position the mixing nozzle 107. Once the mixing unit 103 is securely coupled to the gripper device 111, a robotic mixer unit replacer (not shown) can release the mixing unit 103 and move away until the mixing unit 103 needs to be replaced again.

The first component tubing 131 and the second component tubing 133 can be coupled to an adhesive distribution device such as the one illustrated in FIG. 2. The mixing nozzle 107 can be securely held by the robotic adhesive application arm 139 and the output end of the mixing nozzle 107 can be precisely positioned to deliver the adhesive as required by the industrial application. The positioning of the mixing nozzle 107 on the work piece can be coordinated with the adhesive distribution system so that when the output end of the mixing nozzle 107 is properly positioned, the adhesive distribution system can actuate the valves and pumps to emit the required volume of the mixed adhesive at the target locations. The mixing unit 103 can be used until the adhesive begins to harden within the mixing unit and replacement is required.

With reference to FIG. 7, a top view of the alignment structure 173 which has a recessed groove 177 that matches the outer surface of the mixing block 105. FIG. 8 illustrates a side view of the mixing block 105 placed in the groove 177 of the alignment structure 173. In the illustrated embodiment, the groove 177 is a half cylinder concave surface. In other embodiments, any other suitable groove 177 surface can be used with the alignment structure 173. As discussed, the alignment structure 173 helps to position the mixing unit 103 so that the inlets of the mixing block 105 are aligned with the couplings attached to the jaws. While the alignment structure 173 is illustrated in a specific configuration, in other embodiments the alignment structure can have another geometric shape.

In embodiments that do not have an arrangement like the interaction between the end portions 121, 123 and the recesses 124, discussed above in relation to FIG. 6, when the jaws 117, 119 are in the closed position, the contact of the first component coupling 113 with the first inlet 145 of the mixing block 105 and the contact of the second component coupling 115 with the second inlet 147 can allow rotation of the mixing unit 103 about an axis defined by the first inlet 145 and the second inlet 147. However, the jaws 117, 119 of the gripper device 111 can contact the outer portion of the mixing nozzle 107 of the mixing unit to prevent rotation or movement of the mixing unit 103 relative to the robotic arm 139.

FIG. 9 illustrates a bottom view of the mixing nozzle 107 and the mixing unit in the gripper device 111. In the illustrated embodiment, the end 123 of the first jaw 117 and the end 121 of the second jaw 119 can have concave surfaces which contact multiple points on the outer surfaces of the mixing nozzle 107 to secure the mixing unit to the robotic adhesive application arm. With reference to FIG. 10, a bottom view of the mixing nozzle 107 and the mixing unit in the gripper device 111 with the internal passageways of the mixing block 105 is illustrated. As discussed, the mixing unit is securely held in place by the contact of the first component coupling 113 with the first inlet 145 of the mixing block 105 and the contact of the second component coupling 115 with the second inlet 147 as well as the contact of the ends 121, 123 of the jaws 117, 119 in contact with the outer diameter of the mixing nozzle 107.

Figure 11:
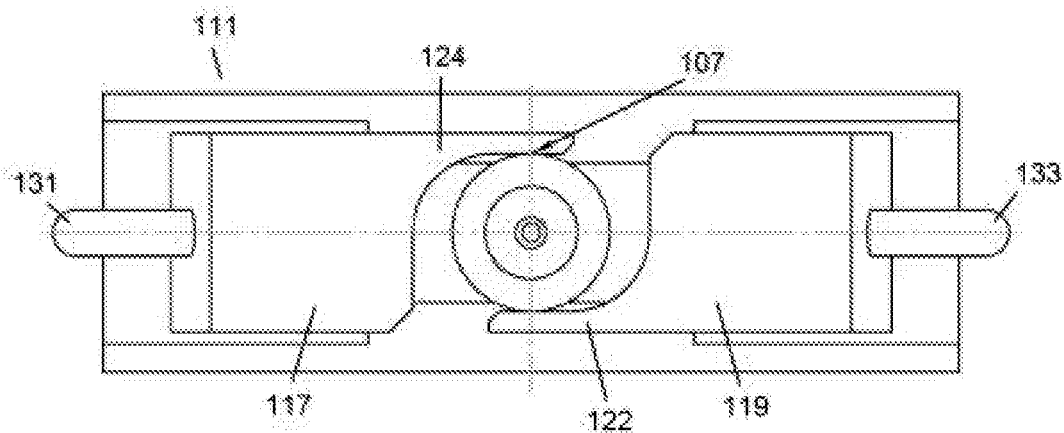

In other embodiments, the end 123 of the first jaw 117 and the end 121 of the second jaw 119 can have different features that securely hold the mixing nozzle 107. For example, in FIG. 11, a bottom view of the mixing nozzle 107 and an alternative embodiment of the mixing unit in a partially closed gripper device 111 is illustrated. In this embodiment, the ends 122, 124 of the jaws 117, 119 have different shaped recessed concave surfaces which contacts an outer cylindrical surface of the mixing nozzle 107. The concave circular surfaces on the ends 121, 123 can match the outer circumference of the contact area of the mixing nozzle 107. When the jaws 117, 119 are fully closed the ends 122, 124 can surround the mixing nozzle 107 and have physical contact with a substantial portion of the outer perimeter of the mixing nozzle 107. Again, the contact of the of the end 124 of the first jaw 117 and the end 122 of the second jaw 117 with the mixing nozzle 107 in the closed positions can prevent rotation or movement of the mixing unit relative to the robotic arm.

Figure 12:
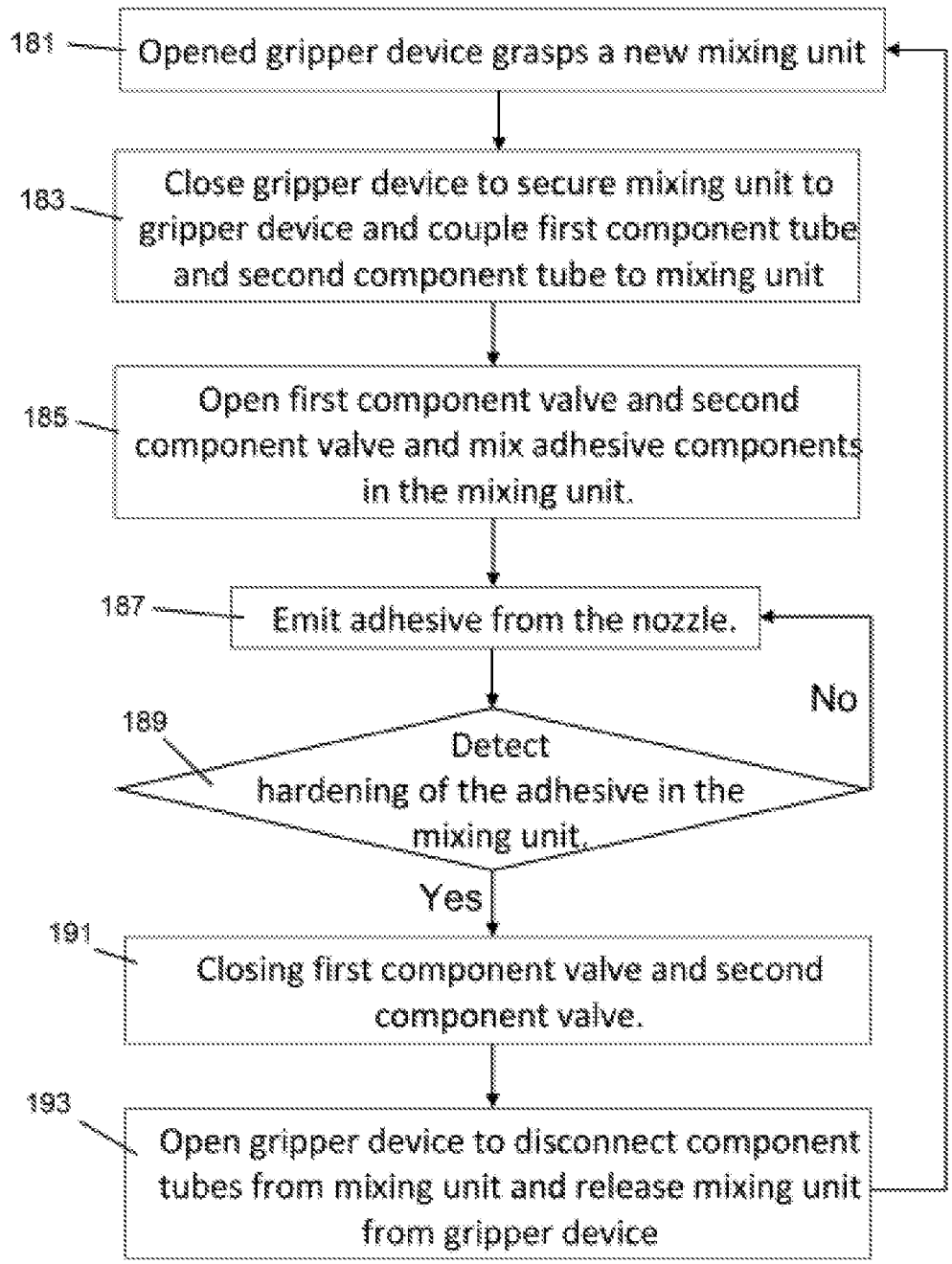
FIG. 12 illustrates a flow chart for a process for installing, using and replacing a used two-component mixing unit.

With reference to FIG. 12, a flowchart of a process for connecting new mixing units to and removing used mixing units from a two-component adhesive distribution system is described. As discussed above with reference to FIG. 5, the robotic arm can be moved to place a new mixing unit from a mixing unit feeder or storage area into an open gripper device (step 181). As discussed above with reference to FIG. 5, the gripper device is closed to secure the mixing unit to the gripper device and couple the first adhesive component tube to the first inlet of the mixing unit and the second adhesive component tube to the second inlet of the mixing unit (step 183). Once the mixing unit is secured to the gripper device, the first adhesive component valve and the second adhesive component valve can be opened, and the system can mix the first adhesive component with the second adhesive component (step 185). The mixed adhesive can be emitted from the nozzle (step 187).

During the adhesive distribution process, the system can detect if hardening of the adhesive in the mixing unit has occurred (step 189). If hardening of the adhesive in the mixing unit has not occurred, the system will continue to emit the adhesive from the nozzle (step 187). However, if hardening of the adhesive is predicted and/or detected by the system, the system can close the first component valve and the second component valve (step 191).

In an embodiment, as described with reference to FIG. 2, the first component valve 135 and the second component valve 137 can be switched to connect the adhesive containers 127, 129 to the cylinders 155, 157 during a recharging process. During the recharging process, the flow of the adhesive to the mixing unit is stopped. In some embodiments, a vacuum can be created so the flow of the adhesive can be reversed to prevent the residual adhesive from leaking from the couplings 113, 115 during the mixing unit replacement process.

With reference to FIG. 12, once the flow of the adhesive is stopped or reversed, the gripper device can be opened to disconnect the adhesive component tubes and connectors from the mixing unit, so the mixing unit can be released from the gripper device (step 193). The robotic arm can then be positioned to place a new mixing unit from a mixing unit feeder or storage area into an open gripper device (step 181) and the process can be repeated.

There are various ways for detecting adhesive hardening in the mixing unit. In an embodiment, the system can monitor the pressures of the first adhesive component and/or the pressure of the second adhesive component to the mixing unit. The pressure can increase over time from the installation of a clean new mixing unit as the adhesive flows through the mixing nozzle. When the pressure is below a predetermined mixing unit change pressure, the system can detect that hardening of the adhesive in the mixing unit has not occurred and the system continues to emit adhesive from the nozzle. However, when the pressure increases above a predetermined mixing unit change pressure, the system can detect that the adhesive has hardened in the mixing unit and the mixing unit needs to be replaced. If errors in the predetermine mixing unit change pressure are detected, this value can be changed and stored in an electronic memory.

In other embodiments, other methods can be used to determine if the adhesive has hardened in the mixing unit. For example, the system may detect the quantity or volume of adhesives that flows through the mixing unit. When the transmitted volume is above a predetermined mixing unit change volume, the system can detect and/or predict that hardening of the adhesive in the mixing unit has not occurred and the system continues to emit adhesive from the nozzle (step 187). However, when the transmitted volume decreases below a predetermined mixing unit change volume, the system can predict that the adhesive has hardened in the mixing unit and the mixing unit needs to be replaced. If errors in the predetermine mixing unit change volume are detected, this value can be changed and stored in an electronic memory.

In some embodiments, some of the adhesive component will collect in the mixing unit from the time that the adhesive components start to flow through the mixing unit. When a new mixing unit is initially used, the system can start a timer. When the mixing unit use time is below a predetermined mixing unit change time, the system can predict that hardening of the adhesive in the mixing unit has not occurred and the system continue to emit adhesive from the nozzle (step 187). However, when the mixing unit use time increases above a predetermined mixing unit change time, the system can detect or predict that the adhesive has hardened in the mixing unit and the mixing unit needs to be replaced. If errors in the predetermined mixing unit change time are detected, this value can be changed and stored in an electronic memory which is coupled to the processor.

When the hardened adhesive is detected or predicted, the processor can close the first component valve and the second component valve (step 191). The processor can then open the gripper device to disconnect the first component tube and the second component tube from the mixing unit and release the mixing unit from the gripper device (step 193). The described process can then be repeated when a new mixing unit is attached to the gripper device (step 181).

The automated mixing unit replacement system solves the problem of replacing a static mixer by an operator. Human involvement is not required to replace the mixing units anymore. The mixing unit replacement system also eliminates the need to clean the mixing area, which also increases the reliability of the equipment. The system eliminates the need to precisely adjust the feeders to the glue mixer, which allows wide use in robotized environment. The system also decreases the average manual operation time for the operation on the production line, which leads to overall production time decrease and lowers the cost of the production (same as product). Thus, the system will increase product line effectiveness and decrease production costs by elimination of the human involvement and automatization of the glue static mixer replacement.

For the avoidance of doubt, the disclosure extends to embodiments as set out in the following clauses:

1. A mixing system comprising:
a mixing unit having:
a mixing block having a first component inlet and a second component inlet and internal passageways which connect the first component inlet and the second component inlet to a mixing block outlet; and
a static mixing nozzle attached to the mixing block outlet;
a gripper device having:
a first component coupling;
a second component coupling;
a first gripper jaw; and
a second gripper jaw;
wherein the gripper device has a closed position in which the first component coupling is compressed against the first component inlet and the second component coupling is compressed against the second component inlet and an open position in which the first component coupling is removed from the first component inlet and the second component coupling is removed from the second component inlet.

2. A mixing system according to clause 1, wherein the first component inlet and the second component are axially aligned.

3. A mixing system according to clause 1 or clause 2, wherein the mixing block is a T shaped structure.

4. A mixing system according to any preceding clause, wherein the first component inlet and the second component are parallel to each other.

5. A mixing system according to any preceding clause, further comprising:
a robotic arm coupled to the gripper device.

6. A mixing system according to clause 5, wherein the gripper device releases the mixing unit from the gripper device after the mixing unit has been used and the gripper device subsequently grasps a replacement mixing unit from a mixing unit storage device.

7. A mixing system according to any preceding clause, wherein the gripper device has a first prong and a second prong that contact the mixing unit when the gripper device is in the closed position.

8. A mixing system according to clause 7, wherein the first prong and the second prong contact the static mixing nozzle when the gripper device is in the closed position.

9. A mixing system according to any preceding clause, wherein the first component inlet and the second component of the mixing unit each have a concave surface or a concave conical surface.

10. A mixing system according to any preceding clause, wherein the first component coupling and the second component coupling each have a convex surface or a convex spherical surface.

11. A mixing system according to clause 6, wherein the first component inlet and the second component inlet of the mixing unit are made of an elastic material.

12. A mixing system according to any preceding clause, wherein in the open position the gripper device has an opening which is wider than the mixing block portion of the mixing unit.

13. A mixing system according to any preceding clause, wherein the first component coupling is attached to a first tube that transmits a first component liquid and the second component coupling is attached to a second tube that transmits a second component liquid.

14. A mixing system according to any preceding clause, further comprising:
   a first valve coupled to the first tube; and
   a second valve coupled to the second tube;
   wherein the first valve and the second valve are closed when the gripper unit is in the open position and the first valve and the second valve are opened when the gripper unit is in the close 15. A mixing system according to clause 14, further comprising:
   a timer that monitors a duration of time from when the first component liquid and the second component liquid are initially delivered from the gripper device to the mixing unit when the gripper device is in the closed position.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the following claims reflect, inventive aspects lie in less than all features of any single foregoing disclosed embodiment.

What is claimed is:

1. A mixing system for a robotic system, the mixing system comprising:
   a mixing unit having:
      a mixing block having a first component inlet and a second component inlet and internal passageways which connect the first component inlet and the second component inlet to a mixing block outlet; and
      a static mixing nozzle attached to the mixing block outlet;
   a gripper device having:
      a first component coupling;
      a second component coupling;
      a first gripper jaw; and
      a second gripper jaw;
   wherein, when the mixing unit is held in the gripper device by the first gripper jaw and the second gripper jaw, the gripper device has a closed configuration in which the first gripper jaw and the second gripper jaw contact the static mixing nozzle, the first component coupling is compressed against the first component inlet and the second component coupling is compressed against the second component inlet, and an open configuration in which the first gripper jaw and the second gripper jaw are in an open position, the first component coupling is removed from the first component inlet and the second component coupling is removed from the second component inlet; and
   a robotic arm coupled to the gripped device.

2. The mixing system as claimed in claim 1, wherein the first component inlet and the second component inlet are axially aligned.

3. The mixing system as claimed in claim 1, wherein the mixing block is a T shaped structure.

4. The mixing system as claimed in claim 1, wherein the gripper device is configured to release the mixing unit from the gripper device after the mixing unit has been used and the gripper device is further configured to subsequently grasp a replacement mixing unit from a mixing unit storage device.

5. The mixing system as claimed in claim 1, wherein the first component inlet and the second component inlet of the mixing unit each have a concave surface or a concave conical surface.

6. The mixing system as claimed in claim 1, wherein the first component coupling and the second component coupling each have a convex surface or a convex spherical surface.

7. The mixing system as claimed in claim 1, wherein the first component inlet and the second component inlet of the mixing unit are made of an elastic material.

8. The mixing system as claimed in claim 1, wherein in the open configuration the gripper device has an opening which is wider than the mixing block of the mixing unit.

9. The mixing system as claimed in claim 1, wherein the first component coupling is attached to a first tube configured to transmit a first component liquid and the second component coupling is attached to a second tube configured to transmit a second component liquid.

10. The mixing system as claimed in claim 9, further comprising:
   a first valve coupled to the first tube; and
   a second valve coupled to the second tube;
   wherein the first valve and the second valve are closed when the gripper unit is in the open configuration and the first valve and the second valve are opened when the gripper unit is in the closed configuration.

11. The mixing system as claimed in claim 10, further comprising:
   a timer that is configured to monitor a duration of time from when the first component liquid and the second component liquid are initially delivered from the gripper device to the mixing unit when the gripper device is in the closed position.

* * * * *